US011639539B2

(12) United States Patent
Dean, Jr. et al.

(10) Patent No.: US 11,639,539 B2
(45) Date of Patent: *May 2, 2023

(54) SYSTEMS AND METHODS FOR MONITORING METAL RECOVERY SYSTEMS

(71) Applicant: FREEPORT MINERALS CORPORATION, Phoenix, AZ (US)

(72) Inventors: John Warren Dean, Jr., Thatcher, AZ (US); Christopher Wooten, Morenci, AZ (US); Chase Zenner, Silver City, NM (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,171

(22) Filed: Apr. 29, 2022

(65) Prior Publication Data

US 2022/0259695 A1 Aug. 18, 2022

Related U.S. Application Data

(63) Continuation of application No. 17/223,404, filed on Apr. 6, 2021, now Pat. No. 11,332,808, which is a
(Continued)

(51) Int. Cl.
*C22B 7/00* (2006.01)
*C22B 3/04* (2006.01)
(Continued)

(52) U.S. Cl.
CPC ............... *C22B 7/007* (2013.01); *C22B 3/04* (2013.01); *C22B 15/0065* (2013.01); *C22B 3/02* (2013.01);
(Continued)

(58) Field of Classification Search
CPC .. C22B 7/007; C22B 3/02; C22B 3/04; C22B 3/22; C22B 3/44; C22B 15/0065;
(Continued)

(56) References Cited

U.S. PATENT DOCUMENTS 3,587,620 A 6/1971 Berthold
3,993,293 A 11/1976 Mukae et al.
(Continued)

FOREIGN PATENT DOCUMENTS

GB 1404243 8/1975

OTHER PUBLICATIONS

International Search Report and Written Opinion dated Jan. 19, 2016 from corresponding International Application PCT/US2015/050015.
(Continued)

*Primary Examiner* — William M McCalister
(74) *Attorney, Agent, or Firm* — Snell & Wilmer L.L.P.

(57) ABSTRACT

Various embodiments provide a leaching solution monitoring module comprising a first leaching solution distribution system interface, a flow meter in fluid communication with the first leaching solution distribution system interface, the flow meter in fluid communication a 3-way pressure regulator, and a second leaching solution distribution system interface in fluid communication with the 3-way pressure regulator.

20 Claims, 6 Drawing Sheets

Related U.S. Application Data continuation of application No. 16/223,760, filed on Dec. 18, 2018, now Pat. No. 10,975,455, which is a continuation of application No. 15/989,614, filed on May 25, 2018, now Pat. No. 10,190,190, which is a continuation of application No. 15/539,328, filed as application No. PCT/US2015/050015 on Sep. 14, 2015, now Pat. No. 9,982,321.

(60) Provisional application No. 62/097,458, filed on Dec. 29, 2014.

(51) Int. Cl.

| | | |
|---|---|---|
| *G05D 16/10* | (2006.01) | |
| *G05D 16/20* | (2006.01) | |
| *C22B 3/02* | (2006.01) | |
| *C22B 15/00* | (2006.01) | |
| *C22B 3/22* | (2006.01) | |
| *C22B 3/44* | (2006.01) | |
| *E21B 43/28* | (2006.01) | |

(52) U.S. Cl.
CPC ............... *C22B 3/22* (2013.01); *C22B 3/44* (2013.01); *E21B 43/28* (2013.01); *G05D 16/101* (2019.01); *G05D 16/2024* (2019.01); *Y02P 10/20* (2015.11); *Y10T 137/86574* (2015.04)

(58) Field of Classification Search
CPC ....... Y10T 137/7761; Y10T 137/86574; Y02P 10/20; G05D 16/101; G05D 16/2024; E21B 43/28
USPC ...................................................... 137/487.5
See application file for complete search history.

(56) References Cited

U.S. PATENT DOCUMENTS

| | | | |
|---|---|---|---|
| 4,045,084 A | 8/1977 | Hsueh et al. | |
| 4,168,295 A | 9/1979 | Sawyer | |
| 4,175,789 A | 11/1979 | Kube et al. | |
| 4,180,088 A * | 12/1979 | Mallett | G01M 3/2807 |
| | | | 137/486 |
| 4,369,100 A | 1/1983 | Sawyer | |
| 4,739,973 A | 4/1988 | Herndon | |
| 4,807,854 A | 2/1989 | Mitchell | |
| 4,974,816 A | 12/1990 | Emmett, Jr. et al. | |
| 5,313,982 A | 5/1994 | Ohmi et al. | |
| 5,329,463 A | 7/1994 | Sierk et al. | |
| 5,598,838 A * | 2/1997 | Servidio | A61M 16/204 |
| | | | 128/204.26 |
| 6,030,048 A | 2/2000 | Hsu | |
| 6,498,031 B1 | 12/2002 | Carter | |
| 9,181,603 B2 * | 11/2015 | Boudreault | A62D 3/36 |
| 9,945,009 B2 * | 4/2018 | Boudreault | C01G 53/04 |
| 9,982,321 B2 | 5/2018 | Dean, Jr. et al. | |
| 10,190,190 B2 | 1/2019 | Dean, Jr. et al. | |
| 10,975,455 B2 | 4/2021 | Dean, Jr. et al. | |
| 2002/0179451 A1 | 12/2002 | Weldon et al. | |
| 2004/0113333 A1 | 6/2004 | Podznoev et al. | |
| 2005/0016593 A1 | 1/2005 | Ephrat et al. | |
| 2006/0054214 A1 | 3/2006 | Caamano et al. | |
| 2008/0102514 A1 | 5/2008 | Coallao Olivares et al. | |
| 2008/0210017 A1 | 9/2008 | Igarashi et al. | |
| 2008/0286180 A1 | 11/2008 | Jones | |
| 2009/0293679 A1 | 12/2009 | Singh et al. | |
| 2011/0178644 A1 | 7/2011 | Picton | |
| 2011/0286542 A1 | 11/2011 | Shelburne | |
| 2011/0303051 A1 | 12/2011 | Gonzalez et al. | |
| 2012/0161374 A1 | 6/2012 | Nakai et al. | |
| 2012/0297928 A1 | 11/2012 | Lang et al. | |
| 2013/0008856 A1 | 1/2013 | Megaw | |
| 2013/0032737 A1 | 2/2013 | Neilson et al. | |
| 2014/0369904 A1 | 12/2014 | Boudreault et al. | |
| 2014/0369907 A1 * | 12/2014 | Boudreault | C01B 13/18 |
| | | | 423/132 |
| 2015/0225808 A1 * | 8/2015 | Boudreault | C22B 23/0423 |
| | | | 423/103 |
| 2019/0119781 A1 | 4/2019 | Dean, Jr. et al. | |
| 2021/0238708 A1 | 8/2021 | Dean, Jr. et al. | |

OTHER PUBLICATIONS

International Preliminary report on Patentability dated Feb. 3, 2017 from corresponding International Application PCT/US2015/050015.
Notice of Allowance and Examiner's Amendment from U.S. Appl. No. 15/539,328 dated Jan. 30, 2018.
Supplemental Notice of Allowability from U.S. Appl. No. 15/539,328 dated Apr. 26, 2018.
Notice of Allowance and Examiner's Amendment from U.S. Appl. No. 15/989,614 dated Sep. 27, 2018.
Examination Report dated Dec. 10, 2018 from corresponding Chilean Patent Application No. 2017-01732 with machine translation of same in English.
Non-Final Office from U.S. Appl. No. 16/223,760, dated Jan. 16, 2020.
Non-Final Office from U.S. Appl. No. 16/223,760, dated Aug. 7, 2020.
Notice of Allowance and Examiner Interview Summary from U.S. Appl. No. 16/223,760, dated Dec. 23, 2020.
Notice of Allowance and Examiner Interview Summary from U.S. Appl. No. 17/223,404, dated Jan. 25, 2022.

* cited by examiner

SYSTEMS AND METHODS FOR MONITORING METAL RECOVERY SYSTEMS

CROSS REFERENCE TO RELATED APPLICATIONS

This application is a continuation of and claims priority to U.S. patent application Ser. No. 17/223,404, entitled "SYSTEMS AND METHODS FOR MONITORING METAL RECOVERY SYSTEMS," which was filed on Apr. 6, 2021 (the "'404 application"). The '404 application is a continuation of and claims priority to U.S. patent application Ser. No. 16/223,760, entitled "SYSTEMS AND METHODS FOR MONITORING METAL RECOVERY SYSTEMS," which was filed on Dec. 18, 2018, now U.S. Pat. No. 10,975,455, issued on Apr. 13, 2021 (the "'760 application"). The '760 application is a continuation of and claims priority to U.S. patent application Ser. No. 15/989,614, entitled "SYSTEMS AND METHODS FOR MONITORING METAL RECOVERY SYSTEMS," which was filed on May 25, 2018, now U.S. Pat. No. 10,190,190, issued on Jan. 29, 2019 (the "'614 application"). The '614 application is a continuation of and claims priority to U.S. patent application Ser. No. 15/539,328, entitled "SYSTEMS AND METHODS FOR MONITORING METAL RECOVERY SYSTEMS," which was filed on Jun. 23, 2017, now U.S. Pat. No. 9,982,321, issued on May 29, 2018 (the "'328 application"). The '328 application is a U.S. National Phase filing under 35 U.S.C § 371 of and claims priority to PCT/US2015/050015, filed on Sep. 14, 2015, which claims priority to U.S. Provisional Patent Application Ser. No. 62/097,458, filed on Dec. 29, 2014. The aforementioned applications are hereby incorporated by reference herein in their entireties.

FIELD OF INVENTION

The present disclosure relates, generally, to systems and methods for monitoring and/or controlling metal recovery systems, and more specifically, to systems and methods for identifying and/or ameliorating plugging due to, for example, crud in various metal recovery systems.

BACKGROUND OF THE INVENTION

Hydrometallurgical treatment of metal bearing materials, such as copper ores, concentrates, and other metal bearing materials, has been well established for many years. Typically, conventional hydrometallurgical processes for copper recovery involve leaching metal bearing materials with an acidic solution, either atmospherically or under conditions of elevated temperature and pressure. The resultant process stream—the pregnant leach solution—is recovered, and a processing step such as solution extraction is used to form a highly concentrated and relatively pure metal value containing aqueous phase. One or more metal values may then be electrowon from this aqueous phase.

Leaching under atmospheric conditions in a heap leaching operation may comprise placing an acidic leaching solution into a collection of ore referred to as a heap to liberate metal values from the ore. Heap leaching may thus involve the use of a leaching solution distribution system, which is typically a large network of pipes or other conduits. The pipes or other conduits may have nozzles or other orifices that are designed to emit leaching solution at a particular target rate.

Leaching solution may be sourced from a variety of locations. Fresh acid and/or water may be used as well as acid and/or water that is recycled or reclaimed from other metal value recovery processes. Accordingly, particulates or other solid phase impurities and/or liquid organic phase containments (also referred to as "crud") may be contained within the leaching solution. Over time, crud may occlude or otherwise obstruct the nozzles and/or orifices of the leaching solution distribution system. Such obstruction restricts leaching solution flow. Improper leaching solution flow is detrimental to metal value recovery processes.

Nozzle and/or orifice occlusion (also referred to as "plugging") may cause an increase in pressure in the pipes of a leaching solution distribution system.

SUMMARY OF THE INVENTION

Various embodiments provide a leaching solution monitoring module comprising a first leaching solution distribution system interface, a flow meter in fluid communication with the first leaching solution distribution system interface, the flow meter in fluid communication a 3-way pressure regulator, and a second leaching solution distribution system interface in fluid communication with the 3-way pressure regulator.

Various embodiments provide a system comprising a plurality of leaching solution monitoring module, each leaching solution monitoring module comprising a first leaching solution distribution system interface, a flow meter in fluid communication with the first leaching solution distribution system interface, the flow meter in fluid communication a 3-way pressure regulator, a second leaching solution distribution system interface in fluid communication with the 3-way pressure regulator, an electronic transmitter for transmitting at least one of flow rate data and pressure data, a gateway configured to receive at least one of flow rate data and pressure data from at least one leaching solution monitoring module in the plurality of leaching solution monitoring module.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION OF EXEMPLARY EMBODIMENTS

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration. While the embodiments are described in sufficient detail to enable those skilled in the art to practice the invention, it should be understood that other embodiments may be realized and that logical and mechanical changes may be made without departing from the spirit and scope of the present invention. Thus, the detailed description herein is presented for purposes of illustration only and not of limitation. For example, steps or functions recited in descriptions any method, system, or process, may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment.

The present disclosure relates, generally, to systems and methods for monitoring and/or controlling metal value recovery systems and, more specifically, to systems and methods for identifying and/or ameliorating plugging due to, for example, crud in various metal recovery systems.

Heap leaching may comprise forming a mass of ore, known as a heap, over a base or pad. Ore, for example, crushed ore, is typically processed to a desired particle size and uniformity. Ore may comprise any metal bearing material, such as an ore, a combination of ores, a concentrate, a process residue, a flotation tailings product, an impure metal salt, combinations thereof, or any other material from which metal values may be recovered. Metal values such as, for example, copper, gold, silver, zinc, platinum group metals, nickel, cobalt, molybdenum, rhenium, uranium, rare earth metals, and the like may be recovered from ore in accordance with various embodiments. In various embodiments, ore comprises copper and copper containing minerals.

To leach, leaching solution is distributed on top of the heap and, by force of gravity, travels down towards the pad. The pad may be sloped toward a collection pipe or conduit for recovering the pregnant leach solution. Leaching solution may comprise any liquid capable of liberating a metal value from ore. In various embodiments, leaching solution may be acidic and may comprise sulfuric acid. However, in various embodiments, leaching solution may be basic and may comprise ammonia or ammonium ions.

Heap leaching may thus comprise distributing a leaching solution over a heap of ore via a leaching solution distribution system. A leaching solution distribution system may generally comprise one or more pipes arranged to deposit leaching solution to the heap. The leaching solution distribution system may be configured in a network arrangement to receive leaching solution from one or more sources and conduct the leaching solution to the heap. The leaching solution may be sourced from a variety of locations. Fresh acid and/or water may be used as well as acid and/or water that is recycled or reclaimed from other metal value recovery processes. In various embodiments, fresh basic medium and/or water may be used as well as basic medium and/or water that is recycled or reclaimed from other metal value recovery processes. Accordingly, the leaching solution distribution system may reach these sources of leaching solution and distribute them to the heap.

The leaching solution distribution system may comprise one or more primary pipes that are fluidly coupled to smaller pipes or branches. The smaller pipes may comprise one or more orifices at predetermined distances. In that regard, the orifices are configured to allow leaching solution to drip or otherwise flow from the smaller pipes and onto the heap. The leaching solution distribution system may be configured to distribute leaching solution within a predetermined flow rate range. For example, a flow rate that is above the predetermined flow rate range may travel to the pad too quickly and not have the opportunity to leach effectively. A flow rate that is below the predetermined flow rate range may not travel quickly enough, wasting valuable time. In that regard, maintaining leaching solution flow rate to be within the predetermined flow rate range is beneficial.

Particulates or other solid phase impurities and/or organic phase contaminants (together, referred to as "crud" as mentioned above) may be contained within the leaching solution. Over time, crud may occlude or otherwise obstruct the orifices of the leaching solution distribution system. Such obstruction restricts leaching solution flow. As discussed above, improper leaching solution flow is detrimental to metal value recovery processes. The flow rate and pressure of leaching solution in a leaching solution distribution system may change in response to one or more orifices becoming plugged. Identifying these changes in flow rate and/or pressure may be accomplished in accordance with various embodiments.

In accordance with various embodiments, a leaching solution monitoring system is disclosed that may comprise one or more leaching solution monitoring modules. The leaching solution monitoring module may comprise a system configured to monitor flow rate and pressure drop across a portion of a leaching solution distribution system. A change in flow rates and/or pressure may allow for identification of one or more plugged orifices.

A leaching solution monitoring module may comprise one or more pipes or conduits configured to fluidly couple to a portion of a leaching solution distribution system, receive leaching solution from the leaching solution distribution system, detect at least one of a flow rate or pressure, and allow the leaching solution to be distributed back to the leaching solution distribution system. In various embodiments, a leaching solution monitoring module may comprise a U shaped geometry or other similar shape to allow for a compact design. A compact design may allow for easy installation into existing leaching solution distribution systems.

In various embodiments, a leaching solution monitoring module may comprise an electronic monitoring module that may receive data regarding at least one of a flow rate or pressure. Data may then be sent, in real time and/or a batch process, through a data network to a monitoring module. The monitoring module may communicate via a data network, for example, a wireless data network, to one or more leaching solution monitoring modules. In that regard, status of the leaching solution monitoring modules may be centralized. Alerts regarding detected issues to be addressed may then be distributed to the appropriate resource for further investigation and/or amelioration. Centralized monitoring may provide enhanced logistics, especially when used in connection with large area heap leaching operations.

Figure 1:
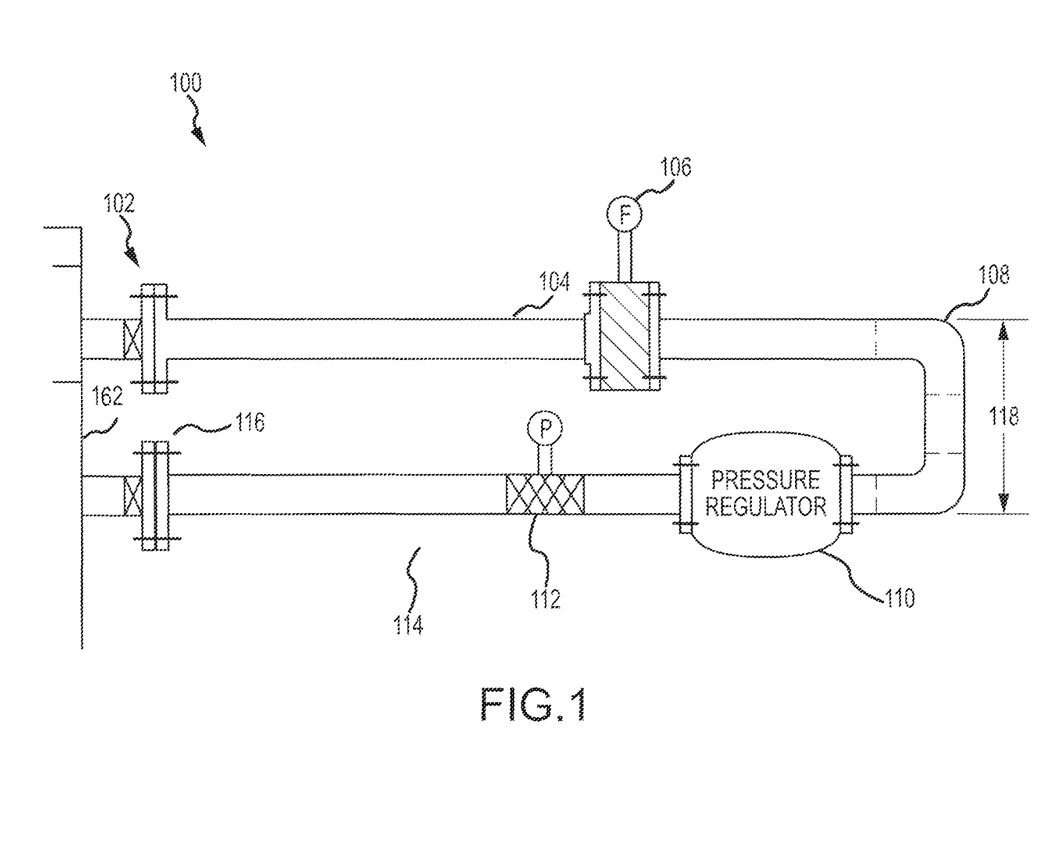
FIG. 1 is a diagram illustrating a leaching solution monitoring system in accordance with various embodiments of the present disclosure.

With reference to FIG. 1, leaching solution monitoring module 100 is illustrated. Interface 102 may comprise a joint that fluidly couples pipe 104 to leaching solution distribution system 162. The term "fluidly couples" or "fluidly coupled" may refer to a configuration allowing a fluid to be communicated from one component to another, for example, from a pipe of leaching solution distribution system 162 to pipe 104. Stated another way, a pipe of leaching solution distribution system 162 is in fluid communication with pipe 104 in that fluid may be pass between them. Interface 102 may comprise a pair of mating flanges secured by one or more fasteners. In this manner, leaching solution may be conducted through interface 102 without loss of leaching solution across interface 102.

Pipe 104 and pipe 114 may comprise any suitable pipe. For example, pipe 104 may comprise any material suited to conduct leaching solution, for example, any metal such as steel and/or any suitable thermoplastic material, provided the thermoplastic material is configured to resist corrosion due to exposure to leaching solution. In various embodiments, pipe 104 and pipe 114 comprise 3" and/or 4" schedule 80 CPVC piping.

Pipe 104 may comprise a length that is at least twice its diameter. Such sizing improves the accuracy of leaching solution monitoring module 100. In various embodiments, as described herein, flow meter 106 may benefit from having a length of two pipe diameters both upstream and downstream of flow meter 106.

Pipe 104 may fluidly couple to flow meter 106. Flow meter may be any device capable of measuring a flow rate. "Flow rate" may refer to volume of fluid per unit time or mass of fluid per unit time within a pipe, while "mass flow rate" may refer to mass of fluid per unit time within a pipe and "volumetric flow rate" may refer to volume of fluid per unit time within a pipe. Flow meter 106 may comprise any suitable technology for detecting a flow rate. Flow meter 106 may comprise a differential pressure flow meter, for example, one having an orifice plate with one or more apertures. An orifice plate with two or more apertures has particular advantages as it is associated with a shorter length of pipe both downstream and upstream from the orifice plate. Stated another way, a more compact leaching solution monitoring module 100 may be achieved using a differential pressure flow meter having an orifice plate with two or more apertures. By introducing an orifice plate into the flow and assessing differential pressure, flow rate after may be determined. For example, flow meter 106 may comprise a compact orifice flowmeter such as a compact orifice flowmeter manufactured by Emerson Electric Company, 8000 West Florissant Avenue, P.O. Box 4100, St. Louis, Mo., USA 63136. More specifically, flow meter 106 may comprise a compact orifice flowmeter sold by Emerson Electric Company under the model number 3051S.

Flow meter 106 may comprise an apparatus configured to measure a flow rate that is in electrical communication with an electronic module to store, process, and/or report the detected flow rate.

An electronic module of flow meter 106 may include a communications interface. Communications interfaces allow data to be transferred between an electronic module and external devices. Examples of communications interface may include a wired Ethernet network, a wireless Ethernet network (e.g., an ad hoc network utilizing IEEE 802.11a/b/g/n/ac), a wireless communications protocol using short wavelength UHF radio waves and defined at least in part by IEEE 802.15.1 (e.g., the BLUETOOTH protocol maintained by Bluetooth Special Interest Group), a low power wireless protocol such as Bluetooth Smart, inductive coupling, near field communication (NFC), or other protocol having a physical link comprising radio frequency (RF) signals. Communications interfaces may also include data transmission protocols such as Highway Addressable Remote Transducer ("HART") protocol, transmission control protocol ("TCP") and Internet Protocol ("IP").

For example, flow meter 106 may comprise a HART protocol interface. The HART protocol is a digital automation protocol that may convey data over a wired or wireless data network. The HART protocol defines a HART packet data structure wherein data may be encapsulated and transmitted. In that regard, the electronic module of the flow meter 106 may be configured to periodically determine the flow rate of the leaching solution passing through the flow meter 106, encode the flow rate into a HART packet data structure and transmit the HART packet data structure to another HART-compliant module, as discussed herein. Flow meter 106 may record flow rate at any suitable period, from about 120 Hz to 1 Hz, and, in various embodiments, once a minute, once every ten minutes, and once every hour or over potentially longer intervals.

Leaching solution may flow from flow meter 106 into U shaped section 108. U shaped section 108 may comprise one or more pipes configured in a U shape. U shaped section 108 may be configured to turn the flow of leaching solution one hundred eighty (180) degrees. Distance 118 is the distance within which the flow of leaching solution is turned. U shaped section 108 is configured to mate with pressure regulator 110 to conduct leaching solution into pressure regulator 110.

Pressure regulator 110 may comprise any suitable pressure regulator. For example, pressure regulator 110 may be any device suitable for regulating pressure within a pipe. Pressure regulator may comprise any device capable of altering the pressure of a fluid in a pipe. For example, pressure regulator 110 may be a pressure sustaining valve and/or a pressure reducing valve and/or a pressure increasing valve. In various embodiments, pressure regulator 110 may further comprise a pressure reducing valve that reduces higher upstream pressure to lower, constant downstream pressure, regardless of fluctuating demand or varying upstream pressure. In various embodiments, pressure regulator 110 may comprise a pressure sustaining valve configured to sustain (i.e., maintain constant) pressure in response to a pressure drop to a pressure below a target value. The pressure regulator 110 may comprise a 3-way valve configured with a vent to prevent a pressure drop (referred to as a "3-way pressure regulator"). In that regard, pressure regulator 110 prevents a pressure drop across leaching solution monitoring module 100. Pressure regulator 110 may comprise a pressure adjustment control feature that is configured to adjust the target pressure. In that regard, the target pressure is the pressure below which pressure regulator 110 will act on the leaching solution to increase pressure in order sustain the target pressure. The pressure adjustment control feature may be adjusted manually or via an electronic interface. In various embodiments, pressure regulator 110 has a 90 psi (lbs/in2) max and will regulate to 5 psi. Pressure regulator 110 may further comprise a filter to capture and remove crud from the leaching solution. Pressure regulator 110 may comprise a BERMAD 120-4 pressure regulating valve, available from Bermad Water Control Solutions, 9424 West Little York Road, Houston, Tex., USA 77040.

Pressure transmitter 112 may be configured to periodically report the pressure of leaching solution across leaching solution monitoring module 100 and/or a binary status of whether the pressure of the leaching solution across leaching solution monitoring module 100 is below the target pressure of pressure regulator 110. Pressure transmitter 112 may comprise an electronic module configured to implement the HART protocol, as described above with reference to flow meter 106. Pressure transmitter 112 may measure pressure data from leaching solution monitoring module 100, for example, by measuring the pressure at a point within or across leaching solution monitoring module 100. In various embodiments, pressure transmitter 112 may package pressure data and transmit the data using the HART protocol. Pressure transmitter 112 may record pressure at any suitable period, from about 120 Hz to 1 Hz, and, in various embodiments, once a minute, once every ten minutes, and once every hour or over potentially longer intervals. In various embodiments, pressure transmitter 112 may be configured to provide status regarding the pressure of leaching solution to the electronic module associated with flow meter 106. In various embodiments, pressure transmitter 112 is housed separately from pressure regulator 110 and flow meter 106 and collects data for broadcast using the HART protocol.

Pressure regulator 110 is configured to interface with pipe 114 and conduct leaching solution to pipe 114. Pipe 114 returns leaching solution to leaching solution distribution system 162 through interface 116. In that regard, interfaces 116 and 102 may be referred to as leaching solution distribution system interfaces.

Figure 2:
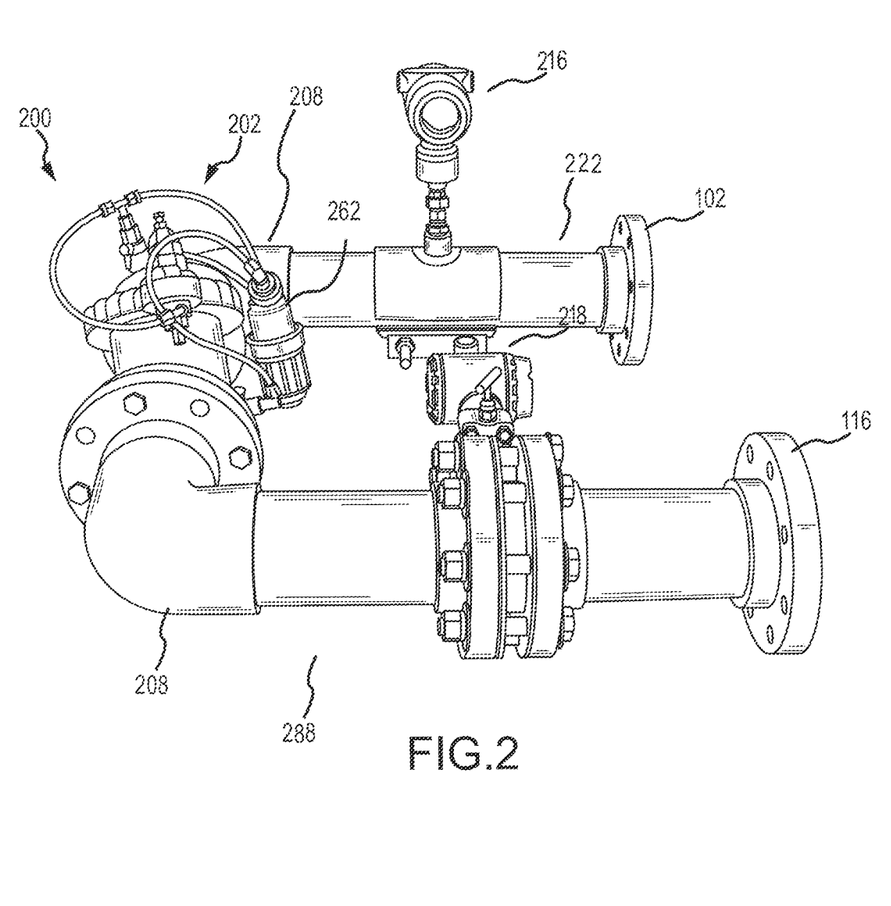
FIG. 2 is a diagram illustrating a leaching solution monitoring system in accordance with various embodiments of the present disclosure.
Figure 3:
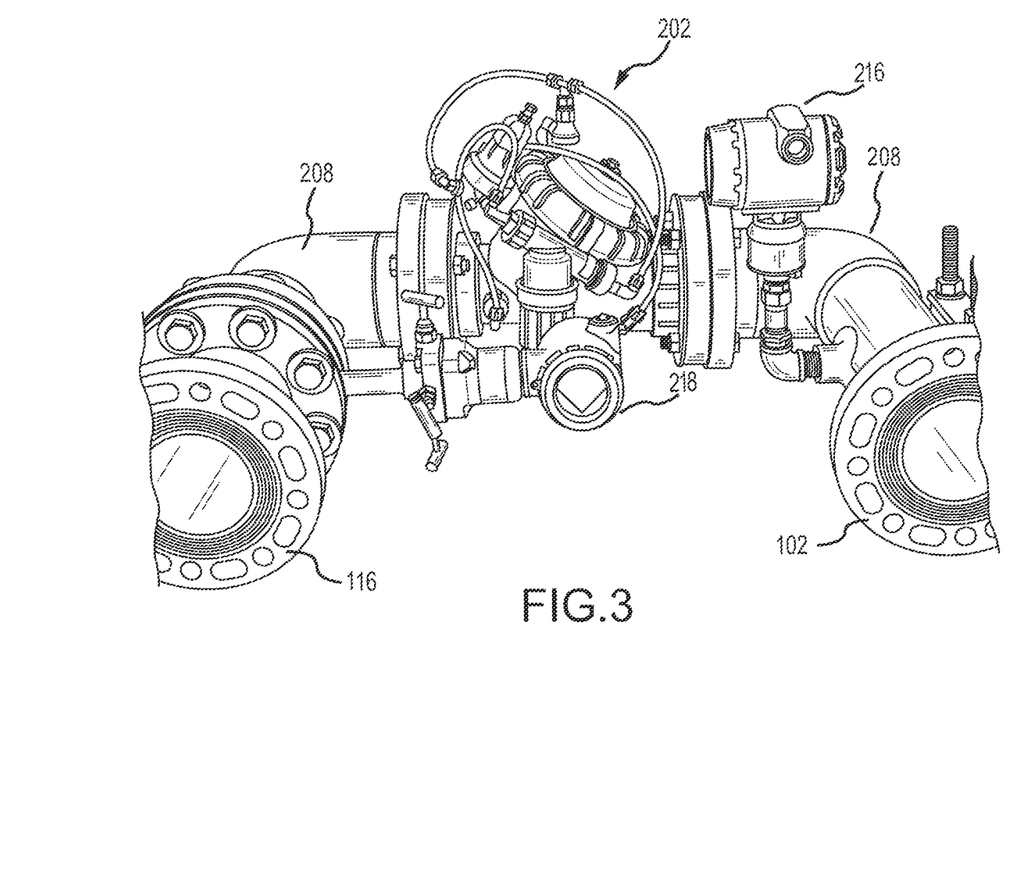
FIG. 3 is a diagram illustrating a leaching solution monitoring system in accordance with various embodiments of the present disclosure.
Figure 4:
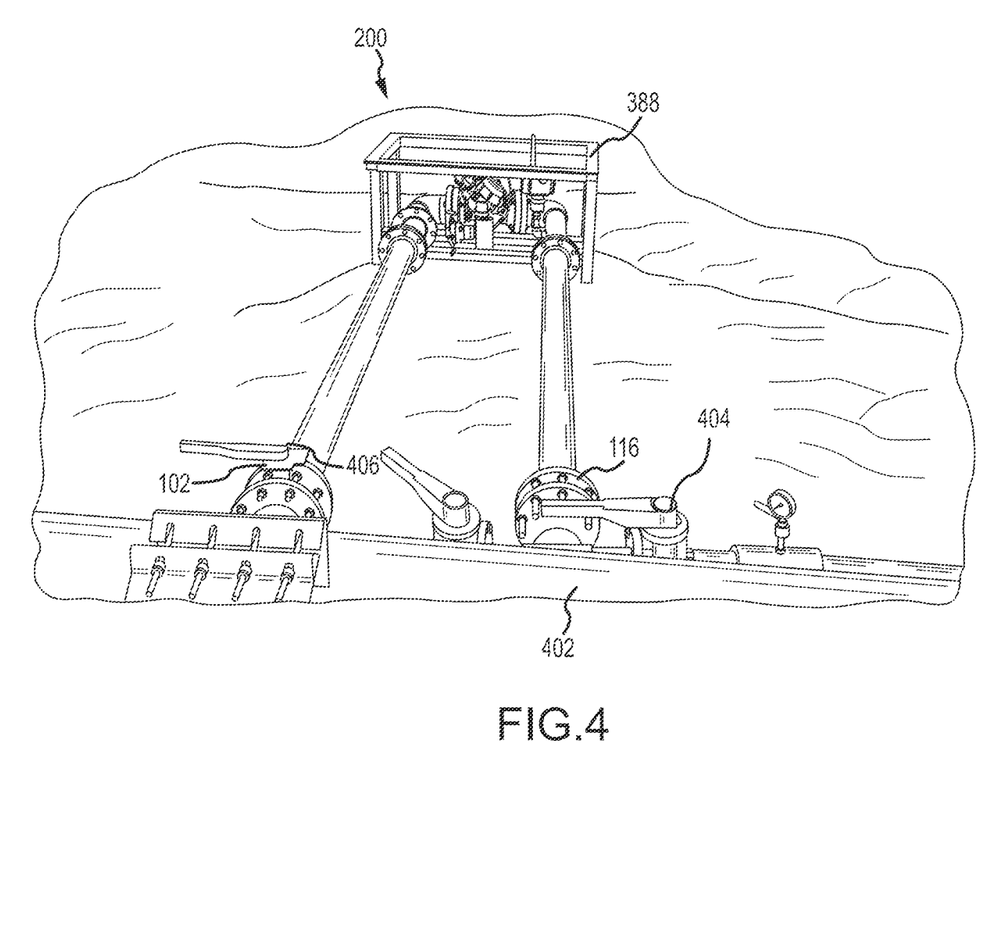
FIG. 4 is a diagram illustrating a leaching solution monitoring system installed at a leaching site in accordance with various embodiments of the present disclosure.

With reference to FIGS. 2-4, in various embodiments, leaching solution monitoring module 200 is shown. Interface 102 and interface 116 are described with respect to leaching solution monitoring module 100. Interface 116 is configured to interface with a leaching solution distribution system and fluidly couple the leaching solution distribution system to pipe section 288. Flow meter 218 is disposed in pipe section 288. Flow meter 218 is configured as described above with respect to flow meter 106. Flow meter 218 receives flow rate data representing the flow rate of the leaching solution and transmits the data via the HART protocol. Pressure transmitter 216 receives pressure data representing the pressure of the leaching solution and transmits the data via the HART protocol.

Elbow joints 208 turn leaching solution flow approximately 90° from pipe section 288 and again at approximately 90° into pipe section 222. Pressure regulator 202 is configured similar to pressure regulator 110. Pressure adjustment control feature 262 is shown as part of pressure regulator 202.

With reference to FIG. 4, leaching solution monitoring module 200 is shown in fluid communication with leaching solution distribution system 402. Valve 404 and 406 control leaching solution flow to leaching solution distribution system 402. In this regard, leaching solution monitoring module 200 may easily be isolated from leaching solution distribution system 402 should that be desired. Leaching solution monitoring module 200 further comprises frame 388. Frame 388 provides a support structure to facilitate the installation and support of leaching solution monitoring module 200. Frame 388 may comprise a metal structure, such as a steel structure, though in various embodiments frame 388 comprises a composite structure to decrease weight. For example, frame 388 may comprise a fiber reinforced resin. In that regard, frame 388 enables multiple instances of leaching solution monitoring module 200 to be easily transported and stored.

Figure 5:
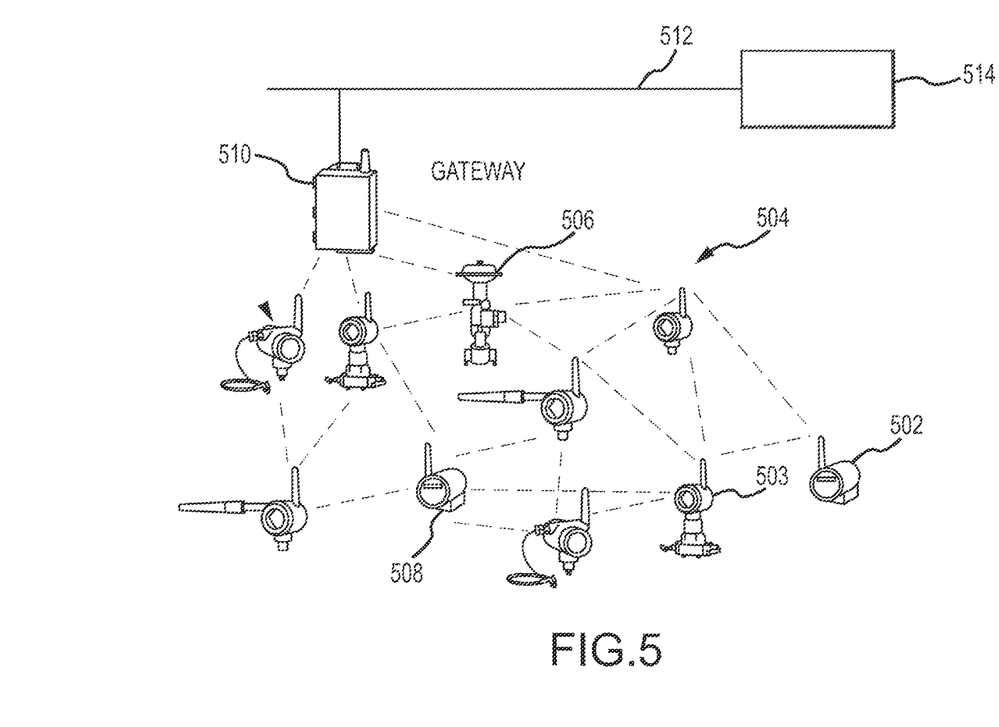
FIG. 5 is a diagram illustrating a network of leaching solution monitoring systems in accordance with various embodiments of the present disclosure.

Across a leaching solution distribution system such as leaching solution distribution system 402, multiple leaching solution monitoring modules, such as leaching solution monitoring module 200, may be installed to monitor various local areas of the leaching solution distribution system. With reference to FIG. 5, centralized monitoring system 500 comprises measurement transmitters 502, 503, 506 and 508 in measurement network 504. A flow meter and/or pressure transmitter as described herein may comprise an electronic module that implements a data transmission protocol such as the HART network. In that regard, measurement transmitters 502, 503, 506 and 508 may transmit data to gateway 510. In various embodiments, a leaching solution distribution system may cover large areas, such as many acres or square miles. In that regard, measurement transmitters 502, 503, 506 and 508 may function as repeaters. Measurement transmitters 502, 503, 506 and 508 may transmit their own data to gateway 510. However in various embodiments, a remote measurement transmitter (i.e., a measurement transmitter far from gateway 510) such as measurement transmitter 502 may transmit data to a measurement transmitter that is closer to gateway 510, such as measurement transmitter 506. Measurement transmitter 506 may then relay or repeat the data transmission from measurement transmitter 502 to gateway 510.

Gateway 510 may be configured to receive data from measurement transmitters 502, 503, 506 and 508. Gateway 510 may implement one or more communications interfaces such as a data transmission protocol (e.g., the HART protocol or a Delta V interface). Gateway 510 may perform preprocessing functions, for example, by aggregating data by measurement transmitter. Gateway 510 may aggregate these data and transmit them via network 512 to processor 514. Network 512 may comprise a wired and/or wireless Ethernet network, as referenced above. Processor 514 may process data from gateway 510 and perform various analytical routines. Processor 514 may implement a Delta V interface to process data to and from gateway 510. The Delta V interface may exist on a Delta V area control network that is able to interface with an Ethernet data network. Processor 514 may process data from gateway 510 using a variety of suitable methods. For example processor 514 may perform graphical analysis and/or may implement a Human Machine Interface (HMI).

Figures 6A, 6B:
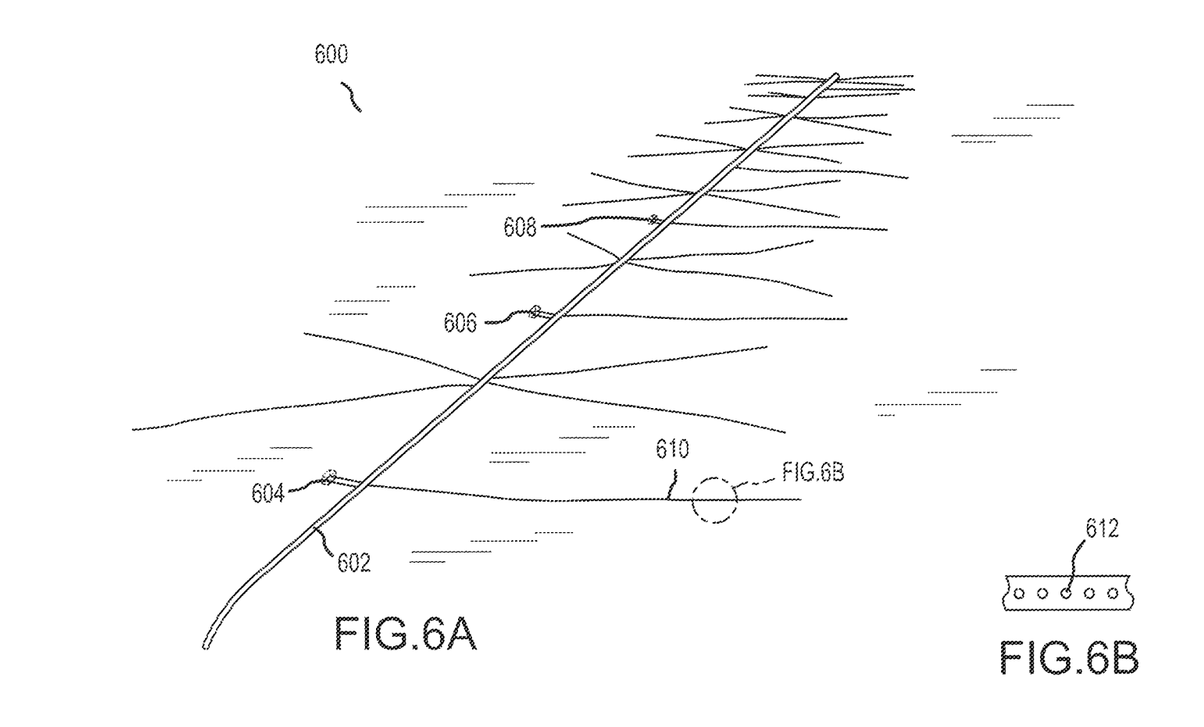
FIG. 6A is a diagram illustrating a leaching solution distribution system fluidly coupled to leaching solution monitoring modules.
FIG. 6B is a diagram illustrating orifices in piping of a leaching solution distribution system.

With reference to FIGS. 6A and 6B, heap leaching operation 600 is shown. Central pipe 602 fluidly communicates leaching solution to branches, such as branch 610, for distribution over the heap. Orifice 612, for example, may allow leaching solution to be emitted from branch 610. Leaching solution monitoring modules 604, 606, and 608 are shown fluidly coupled to central pipe 602.

In operation, and with reference to FIGS. 2-4, a leaching solution monitoring module, such as leaching solution monitoring module 200, may observe a flow rate change. A flow change may be indicative of plugging of an orifice in the leaching solution distribution system. Data indicative of a flow rate change may be sent via measurement transmitter 502 to gateway 510. Processor 514 may receive the data indicative of a flow rate from gateway 510 and initiate a response. Processor 514 may provide an alert in response to receiving data indicative of at least one of an abnormal flow rate and a low flow rate. An abnormal flow rate may be a flow rate that is outside a predetermined flow rate range. For example, the processor 514 may send an email, an SMS message, and or other communication in response to the data that is indicative of a flow rate. For example, one may be dispatched to the particular area of the leaching solution distribution system to fix the plugged orifice. Upon correction, the leaching solution monitoring module will continue to report a desired flow rate.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and subcombinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method for identifying plugging of an orifice of a metal recovery system comprising:
    passing a leaching solution to a metal-bearing material through a leaching solution system, the leaching solution system comprising:
        a monitoring module, which includes:
            a first leaching solution distribution system interface;
            a flow meter in fluid communication with the first leaching solution distribution system interface;
            a 3-way pressure regulator comprising a 3-way valve in communication with the flow meter;
            a second leaching solution distribution system interface in fluid communication with the 3-way pressure regulator; and
            a leaching solution distribution system comprising a primary pipe and a branch coupled to the primary pipe through the first and second leaching solution distribution system interfaces, thereby allowing the leaching solution to be distributed back to the primary pipe through the second leaching solution distribution system interface, wherein the branch comprises the orifice;
    measuring, by the flow meter, at least one of a flow rate and a pressure of the leaching solution; and
    detecting, by a monitoring system, a flow change indicative of a plugged condition of the orifice via data of the at least one of the flow rate and the pressure.

2. The method of claim 1, wherein the monitoring system comprises a transmitter configured to transmit the data of the at least one of the flow rate and the pressure.

3. The method of claim 1, wherein the monitoring system comprises a gateway configured to receive and transmit the data of the at least one of the flow rate and the pressure.

4. The method of claim 1, wherein the monitoring system comprises a processor configured to receive and process the data of the at least one of the flow rate and the pressure.

5. The method of claim 1, wherein the monitoring system is a centralized monitoring system.

6. The method of claim 1, wherein the 3-way pressure regulator comprises a pressure adjustment control feature.

7. The method of claim 1, wherein the 3-way pressure regulator comprises a pressure sustaining valve.

8. The method of claim 1, wherein the flow meter is a differential pressure flow meter.

9. The method of claim 1, wherein the monitoring system comprises a pressure transmitter configured to transmit data of the pressure of the leaching solution to the monitoring system.

10. The method of claim 1, wherein the detecting comprises:
    transmitting, by a transmitter, the data of the at least one of the flow rate and the pressure to a gateway;
    transmitting, by the gateway, the data of the at least one of the flow rate and the pressure to a processor;
    processing, by the processor, the data of the at least one of the flow rate and the pressure; and
    determining the flow change indicative of the plugged condition of the orifice via the processing.

11. The method of claim 1, wherein the monitoring system comprises two transmitters, a first transmitter and a second transmitter, wherein the second transmitter is configured to function as a repeater to receive and transmit data of at least one of the flow rate and the pressure from the first transmitter.

12. The method of claim 1, wherein the monitoring system comprises a gateway, and a data network, wherein the data network is coupled to the gateway and a processor is configured to communicate with the gateway via the data network.

13. The method of claim 1, wherein the monitoring system comprises a transmitter, and a gateway, wherein the transmitter is configured to transmit the data of the at least one of the flow rate and the pressure to the gateway, wherein the gateway is configured to transmit the data of the at least one of the flow rate and the pressure to a processor, wherein the processor is configured to process the data of the at least one of the flow rate and the pressure to determine the flow change indicative of the plugged condition of the orifice.

14. The method of claim 1, wherein the flow meter transmits the data of the at least one of the flow rate and the pressure to the monitoring system.

15. The method of claim 3, wherein the gateway communicates with the monitoring module via a Highway Addressable Remote Transducer protocol.

16. A method for monitoring a metal recovery system comprising:
- passing a leaching solution to a metal-bearing material at a first pressure and a first flow rate through a leaching solution system, the leaching solution system comprising:
  - a monitoring module, which includes:
    - a first leaching solution distribution system interface;
    - a flow meter in fluid communication with the first leaching solution distribution system interface;
    - a 3-way pressure regulator comprising a 3-way valve in communication with the flow meter;
    - a second leaching solution distribution system interface in fluid communication with the 3-way pressure regulator; and
    - a leaching solution distribution system connected to the first and second leaching solution distribution system interfaces, thereby allowing the leaching solution to be distributed back to the leaching solution distribution system through the second leaching solution distribution system interface;
- measuring, by the flow meter, at least one of a flow rate and a pressure of the leaching solution; and
- detecting, by a monitoring system, at least one of an abnormal flow rate and a low flow rate of the leaching solution via data of the at least one of the flow rate and the pressure, wherein the monitoring system comprises a processor configured to receive and process the data of the at least one of the flow rate and the pressure; and
- transmitting, by the processor, an alert in response to receiving data indicative of at least one of the abnormal flow rate and the low flow rate.

17. The method of claim 16, wherein the alert comprises at least one of an SMS message and an email.

18. The method of claim 16, wherein the monitoring system is a centralized monitoring system.

19. The method of claim 16, wherein the detecting comprises:
- transmitting, by a transmitter, the data of the at least one of the flow rate and the pressure to a gateway;
- transmitting, by the gateway, the data of the at least one of the flow rate and the pressure to the processor;
- processing, by the processor, the data of the at least one of the flow rate and the pressure; and
- determining the at least one of the abnormal flow rate and the low flow rate of the leaching solution via the processing.

20. The method of claim 16, wherein the method further comprises adjusting the at least one of the flow rate and the pressure of the leaching solution through the leaching solution distribution system.

* * * * *